(12) United States Patent
Chen

(10) Patent No.: US 11,179,689 B1
(45) Date of Patent: Nov. 23, 2021

(54) CALCIUM REACTION CONTROL METHOD AND DEVICE

(71) Applicant: Szu-Chia Chen, Taoyuan (TW)

(72) Inventor: Szu-Chia Chen, Taoyuan (TW)

( * ) Notice: Subject to any disclaimer, the term of this patent is extended or adjusted under 35 U.S.C. 154(b) by 0 days.

(21) Appl. No.: 16/942,740

(22) Filed: Jul. 29, 2020

(51) Int. Cl.
*B01J 4/00* (2006.01)
*B01J 19/00* (2006.01)
*B01J 4/02* (2006.01)
*A01K 63/04* (2006.01)

(52) U.S. Cl.
CPC ............ *B01J 4/008* (2013.01); *A01K 63/04* (2013.01); *B01J 4/02* (2013.01); *B01J 19/0033* (2013.01); *B01J 19/0086* (2013.01); *B01J 2204/002* (2013.01); *B01J 2219/002* (2013.01); *B01J 2219/0022* (2013.01); *B01J 2219/0024* (2013.01); *B01J 2219/00186* (2013.01); *B01J 2219/00207* (2013.01); *B01J 2219/00231* (2013.01)

(58) Field of Classification Search
CPC . B01J 4/008; B01J 4/02; B01J 19/0086; B01J 19/0033; B01J 2219/002; B01J 2219/00186; B01J 2219/0024; B01J 2219/00231; B01J 2219/00207; B01J 2219/0022; B01J 2204/002; C02F 1/685; C02F 1/686
See application file for complete search history.

(56) References Cited

U.S. PATENT DOCUMENTS 7,025,883 B1 * 4/2006 Olivier .................. A01K 63/04
                                                     210/602

* cited by examiner

*Primary Examiner* — Lessanework Seifu

(57) ABSTRACT

A calcium reaction control method and device, which can adjust the input amount of carbon dioxide gas inputted into the calcium reactor according to the measurement of the concentration of carbonate ions in the solution to be tested, and input the calcium reaction water from the calcium reactor into the water tank to provide the required carbonate ion concentration in the water tank. By means of the present invention, the amount of carbon dioxide input and the amount of calcium reaction water can be controlled, which can improve the control accuracy and ease of use.

10 Claims, 4 Drawing Sheets

CALCIUM REACTION CONTROL METHOD AND DEVICE

BACKGROUND OF THE INVENTION

1. Field of the Invention

The present invention relates to calcium reaction technology and more particularly, to a calcium reaction control method and device, which accurately adjust the carbonate ion concentration value in the solution to be measured to meet the concentration preset value.

2. Description of the Related Art

To cultivate corals, the KH/Ca/Mg concentration in the coral tank must be stabilized, especially if the KH concentration is slightly unstable or falls to fast, the delicate corals will peel off and die. At present, calcium reactors are used to stabilize the KH/Ca/Mg concentration, supplement the calcium ions and carbonate ions consumed by corals. It is mainly to input carbon dioxide and dissolve the wollastonite, thereby producing KH/Ca/Mg. However, the calcium reactor has the disadvantages of difficult to adjust and unstable output and $CO_2$ bubble number. Furthermore, the demand for corals per hour varies throughout the day, and the consumption of turning on or off the lights is also very different.

In addition, there are also PH controllers used to control the PH value (acid value) in the calcium reactor, which can make the water output flow rate of the calcium reactor more stable, but with poor control of the water output flow rate or blockage of the water output, so that the PH controller is used to control $CO_2$ flow will be unstable, and the relative KH/Ca/Mg concentration is of course unstable. If the KH (carbonate ion) value keeps falling, the corals will peel off and die.

SUMMARY OF THE INVENTION

The present invention has been accomplished under the circumstances in view. It is therefore the main object of the present invention to provide a calcium reaction control method and device, which uses a calcium reaction controller to control the operation of the calcium reactor, and to adjust the input amount of carbon dioxide gas manually or automatically, so as to adjust the concentration of carbonate ions and to make the water in the breeding tank reach the best living environment, thereby solving the problem of high difficulty and instability of the existing calcium reactors to adjust the carbon dioxide gas output and the calcium reactor water output.

To achieve this and other objects of the present invention, a calcium reaction control method is applied to a calcium reactor that is used to provide a calcium reaction water. The calcium reaction control method comprises the steps of: measuring the carbonate ion concentration value in the solution to be tested in a water tank; adjusting the input amount of carbon dioxide gas inputted into the calcium reactor according to the aforementioned measurement results; and adjusting the input amount of the carbon dioxide gas to the input amount of the previous set value, and increasing the number of carbon dioxide gas input times, and then inputting the calcium reaction water into the water tank until the carbonate ion concentration value of the solution to be tested in the water tank is same as a concentration preset value when the carbonate ion concentration value is lower than the concentration preset value, or, adjusting the input amount of carbon dioxide gas to the input amount of the previous set value, and decreasing the number of carbon dioxide gas input times, and then inputting the calcium reaction water into the water tank until the carbonate ion concentration value of the solution to be tested in the water tank is same as the concentration preset value when the carbonate ion concentration value is higher than the concentration preset value.

To achieve this and other objects of the present invention, a calcium reaction control device is coupled to a water tank storing the solution to be tested, a calcium reactor and a calcium reaction measuring device. The calcium reaction control device comprises a body and a carbon dioxide gas inlet and a carbonate ion signal transmission unit provided in the body. The carbon dioxide gas inlet is adapted for receiving a carbon dioxide gas. The carbonate ion signal transmission unit is coupled to the calcium reaction measuring device. The calcium reaction measuring device is adapted for measuring the carbonate ion concentration value in the solution to be tested. According to the measurement result received from the carbon ion signal transmission unit, when the carbonate ion concentration value is lower than a concentration preset value, adjust the input amount of the carbon dioxide gas to the input amount of the previous set value, and increase the number of carbon dioxide gas input times, and then input the calcium reaction water into the water tank until the carbonate ion concentration value of the solution to be tested in the water tank is same as a concentration preset value. When the carbonate ion concentration value is higher than the concentration preset value, adjust the input amount of the carbon dioxide gas to the input amount of the previous set value, and decrease the number of carbon dioxide gas input times, and then input the calcium reaction water into the water tank until the carbonate ion concentration value of the solution to be tested in the water tank is same as the concentration preset value.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
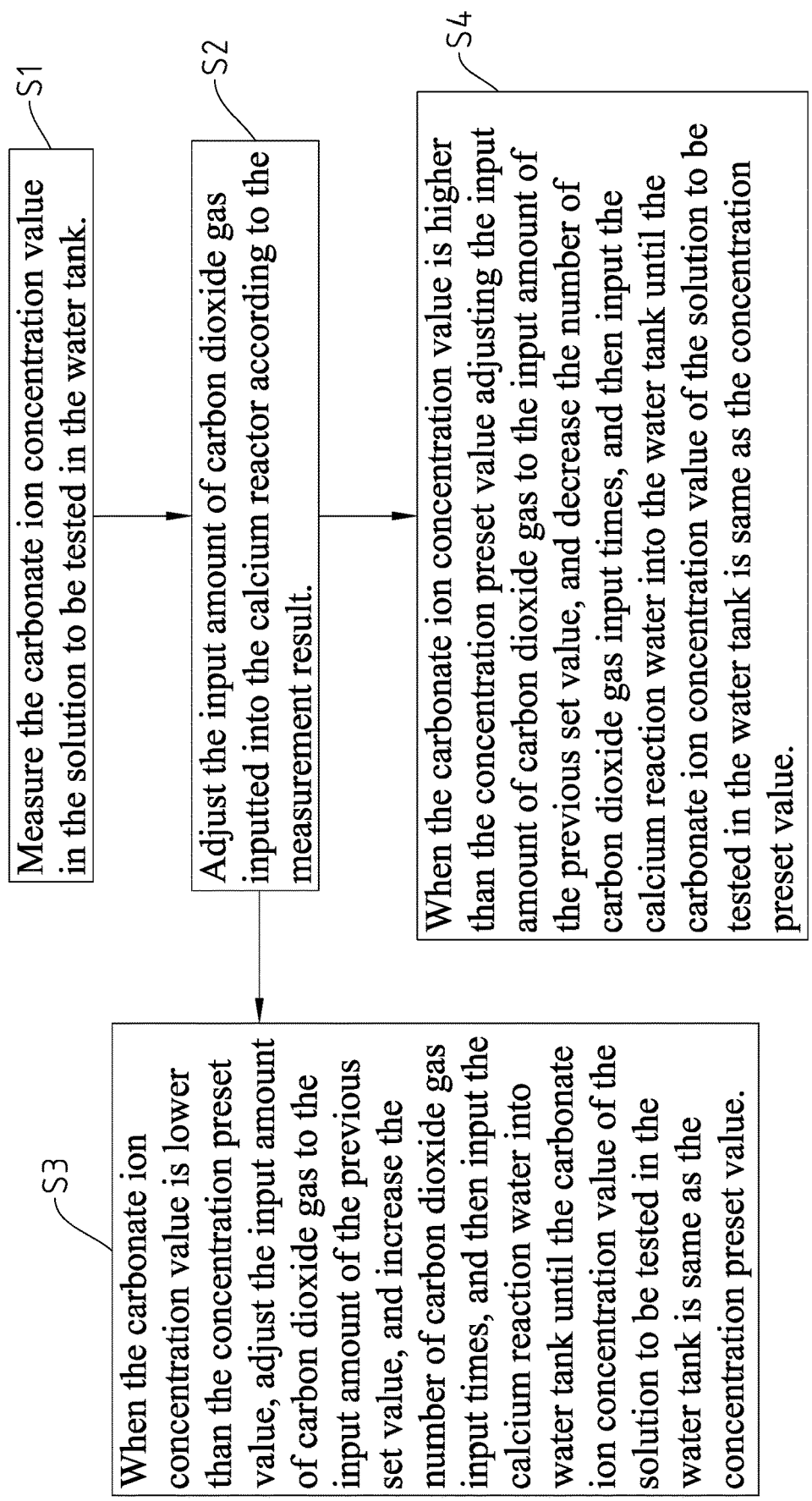
FIG. 1 is a flow chart of a calcium reaction control method in accordance with the present invention.
Figure 2:
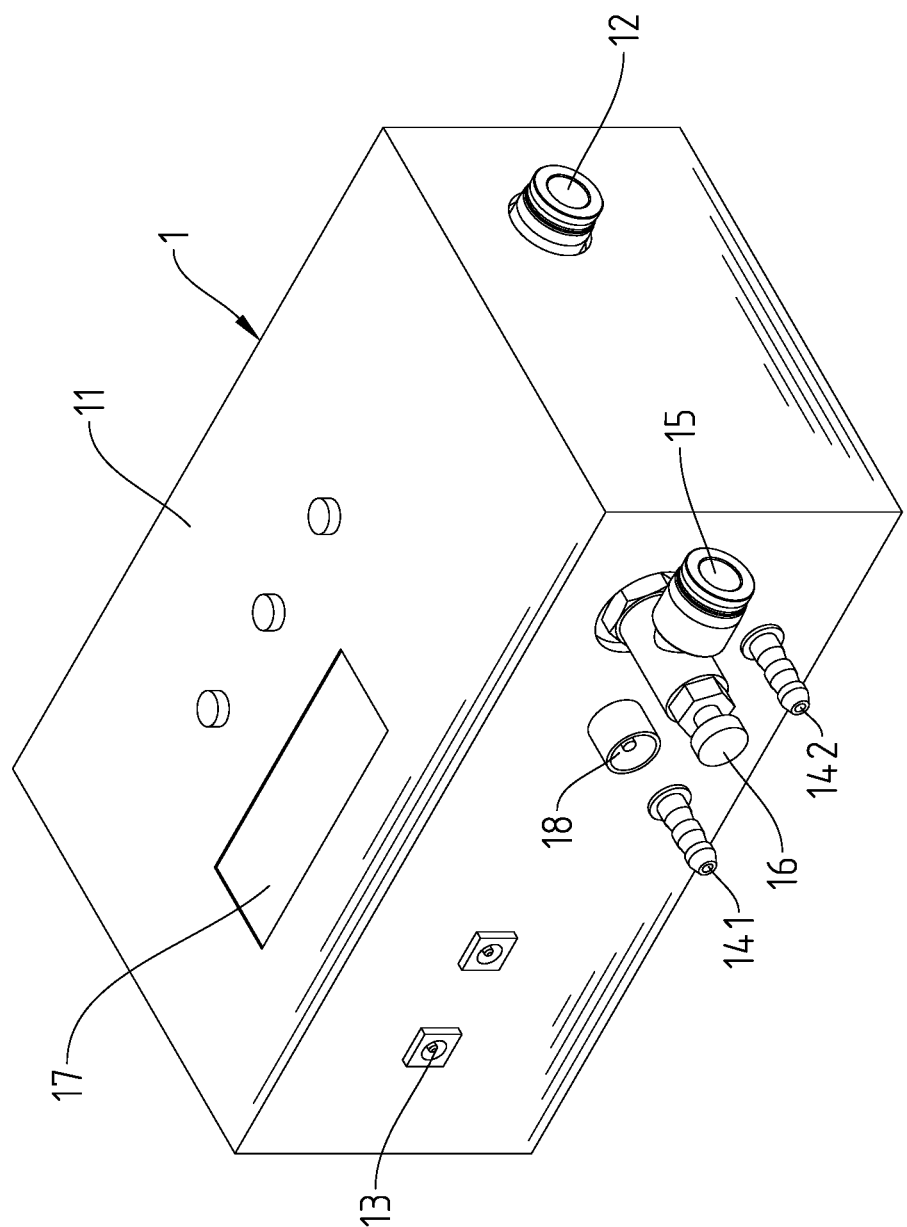
FIG. 2 is an oblique top elevational view of a calcium reaction control device in accordance with the present invention.
Figure 3:
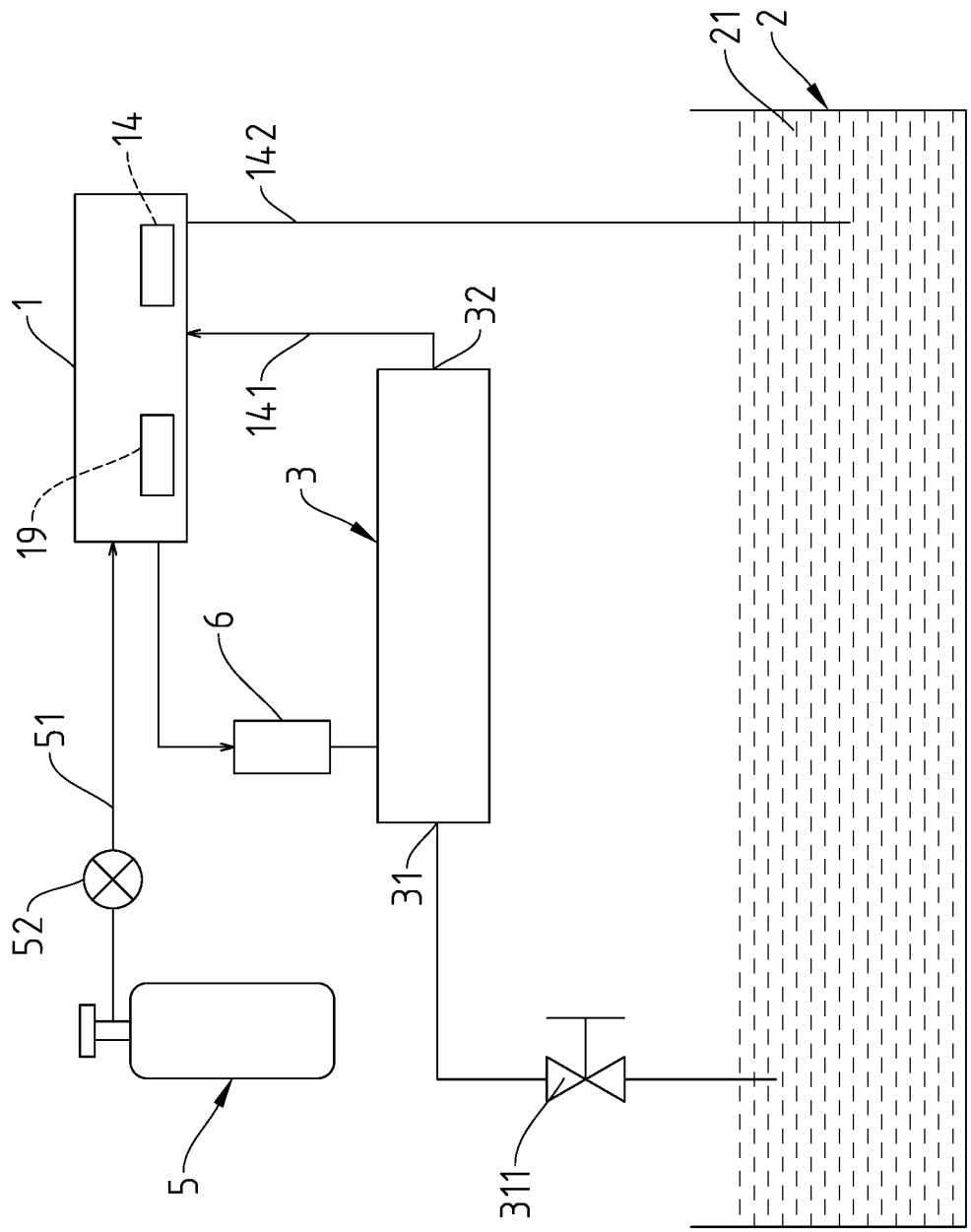
FIG. 3 is a system block diagram of the present invention.
Figure 4:
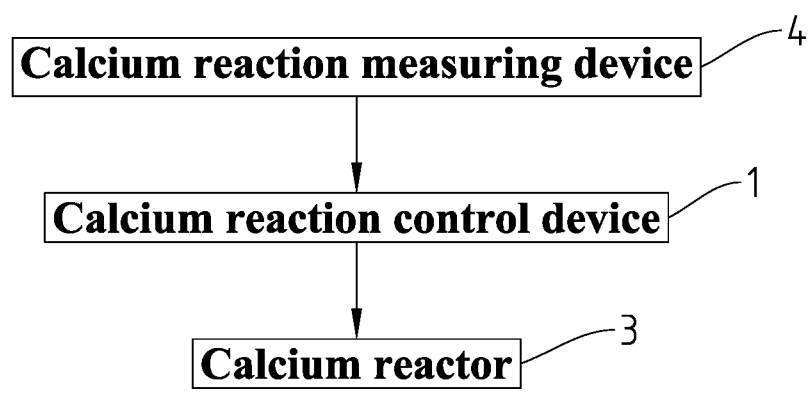
FIG. 4 is a functional block diagram of the present invention.

Referring to FIGS. 1-4, a calcium reaction control device 1 is coupled to a water tank 2 storing the solution to be tested 21, a calcium reactor 3 and a calcium reaction measuring device 4. The calcium reaction control device 1 comprises a body 11 and a carbon dioxide gas inlet 12, a carbonate ion signal transmission unit 13, a water valve switch 14, a carbon dioxide gas outlet 15, a speed adjuster 16 and a carbon dioxide quantitative controller 19 provided in the body 11. The speed adjuster 16 is coupled to the carbon dioxide gas outlet 15 and adjusts the carbon dioxide gas output speed of the carbon dioxide gas outlet 15. The carbon dioxide gas inlet 12 is for receiving carbon dioxide gas. The carbon dioxide gas inlet 12 is mainly connected to a carbon dioxide cylinder 5 through a high-pressure pipe 51, and a pressure reducing valve 52 (decompression control of about 4 kg/cm$^2$) is further provided in the carbon dioxide cylinder 5. In order to avoid the output pressure of the carbon dioxide cylinder 5 (at a pressure of about 70 kg/cm$^2$) being too large, the pressure reducing valve 52 is used to precisely control the carbon dioxide gas output flow rate of the carbon dioxide cylinder 5. The carbon dioxide quantitative controller 19 is coupled to the carbon dioxide cylinder 5 to control the output bubble number of carbon dioxide gas. The speed adjuster 16 is coupled to the carbon dioxide gas outlet 15 to adjust the output speed of carbon dioxide gas, so that the output of carbon dioxide gas is outputted from the carbon dioxide gas outlet 15. Adjusting the output speed of carbon dioxide gas can relatively adjust the input amount of carbon dioxide gas received by the carbon dioxide gas inlet 12.

The calcium reactor 3 is further provided with a calcium reactor water inlet 31 and a calcium reactor water outlet 32. The calcium reactor water inlet 31 is connected to the solution to be tested 21 of the water tank 2. The calcium reactor water inlet 31 is provided with a control water valve 311 to control the flow rate of the solution to be tested 21 of the water tank 2 flowing through the calcium reactor water inlet 31 into the calcium reactor 3. The water valve switch 14 is a servo ball valve (not shown), comprising a calcium reactor water inlet pipe 141 and a water tank water inlet pipe 142. The calcium reactor water inlet pipe 141 is connected to the calcium reactor water outlet 32. The water tank water inlet pipe 142 is connected to the water tank 2. The water valve switch 14 controls the flow rate of the water flowing through the calcium reactor water inlet pipe 141 and the flow rate of the water flowing through the water tank water inlet pipe 142.

The carbonate ion signal transmission unit 13 of the calcium reaction control device 1 is coupled to the calcium reaction measuring device 4. As in step S1, use the calcium reaction measuring device 4 to measure the carbonate ion concentration value in the solution to be tested 21, and the measured signal is transmitted to the calcium reaction control device 1 via the carbonate ion signal transmission unit 13. Thus, the test result of the amount of the carbonate ion concentration value is obtained. The source of calcium carbonate is mainly carbon dioxide gas, and the number of bubbles of carbon dioxide gas determines the level of carbonate ion concentration value. After the carbonate ion concentration value is stable, adjust the water output of the calcium reactor. As in step S2, according to the measurement results of the calcium reaction measuring device 4, it is determined whether the carbonate ion concentration value is lower than the concentration preset value, and accordingly the input amount of carbon dioxide gas input to the calcium reactor 3 is adjusted.

The solution to be tested 21 flows out of the water tank 2 through the calcium reactor water inlet 31 into the reaction chamber (not shown) of the calcium reactor 3. The carbon dioxide gas outputted from the carbon dioxide cylinder 5 is inputted into the carbon dioxide gas inlet 12 of the calcium reaction control device 1, then the calcium reaction control device 1 controls the input of carbon dioxide gas into the reaction chamber of the calcium reactor 3, allowing the carbon dioxide gas to react with the solution to be tested 21 in the reaction chamber to form calcium reaction water. Calcium carbonate, such as calcium stone or coral bone, is stored in the reaction chamber of the calcium reactor 3, which can react with the solution to be tested 21 and the carbon dioxides to form calcium reaction water.

Determine the conditions to adjust the input amount of carbon dioxide gas as in step S3. If it is determined that the carbonate ion concentration value is lower than the concentration preset value, adjust the input amount of carbon dioxide gas to the input amount of the previous set value, and increase the number of carbon dioxide gas input times, and then the calcium reaction water is inputted from the calcium reactor 3 through the calcium reaction control device 1 into the water tank 2 until the carbonate ion concentration value of the solution to be tested 21 in the water tank 2 reaches the concentration preset value. If it is determined that the carbonate ion concentration value is lower than the concentration preset value, the number of times of carbon dioxide gas input is a single increase, for example, the number of carbon dioxide bubbles required per carbonate ion unit is used to increase the number of input times, that is, a single increase may also be a multiple increase. When the difference between the carbonate ion concentration value and the concentration preset value is the maximum value, the input amount of carbon dioxide gas is adjusted to the maximum input percentage of the value set in the previous time. For example, the calcium reaction control device 1 has a quantitative control interface 17, which can control the input amount of carbon dioxide gas. The quantitative control interface 17 can be set for manual control or automatic control. If it is a manual control procedure, the time can be set from 0 to 23 o'clock to the maximum input of carbon dioxide gas per hour. For example, the input at 0 o'clock is 10 times, about 100 cc, and carbon dioxide bubbles are sprayed every 20 seconds; 15 times at 1 o'clock, 20 times at 8 o'clock to make calcium carbonate until the carbonate ion concentration value is same as the concentration preset value. If it is an automatic control procedure, the calcium reaction control device 1 automatically adjust the maximum input amount of carbon dioxide gas in the previous hour according to the measurement results of the carbonate ion signal transmission unit 13 to adapt to the slow change in demand for the carbonate ion concentration value. For example, when the measured carbonate ion concentration value at 1 o'clock is lower than the concentration preset value, the maximum input amount of carbon dioxide gas at 0 o'clock is automatically increased once, that is, the original input at 0 o'clock is 10 times, about 100 cc, increased here once to 11 times, about 110 cc.

As in step S4, if it is determined that the carbonate ion concentration value is higher than the concentration preset value, adjust the input amount of carbon dioxide gas to the input amount of the previous set value, and decrease the number of carbon dioxide gas input times, and then the calcium reaction water is inputted from the calcium reactor 3 through the calcium reaction control device 1 into the water tank 2 until the carbonate ion concentration value of the solution to be tested 21 in the water tank 2 is same as the concentration preset value. If it is determined that the carbonate ion concentration value is higher than the concentration preset value, the number of times of carbon dioxide gas input is a single decrease, for example, the number of carbon dioxide bubbles required per carbonate ion unit is used to decrease the number of input times, that is, a single decrease may also completely stop the input of carbon dioxide bubbles. When the difference between the carbonate ion concentration value and the concentration preset value is the maximum value, the carbon dioxide gas input is adjusted to the minimum value of the minimum input percentage of the set value. The set value of the input amount of carbon dioxide gas is that the minimum input amount of carbon dioxide gas is 50% of the maximum input amount of carbon dioxide gas. If it is a manual control procedure, at 8 o'clock, the carbonate ion concentration value is higher than the concentration preset value, and the minimum input amount of carbon dioxide gas can be set to 20 times multiplied by 50%, that is, the input amount of carbon dioxide gas is reduced to 10 times at 8 o'clock to slow down the rate of decrease of the carbonate ion concentration value. If it is an automatic control procedure, according to the measurement result of the carbonate ion signal transmission unit 13, the carbonate ion concentration value may be unstable due to temperature or light, etc., so that the minimum input amount of carbon dioxide is still too high, then automatically adjust to reduce the minimum input percentage of the set value. For example, at 8 o'clock, the carbonate ion concentration value is higher than the concentration preset value, then the minimum input amount of carbon dioxide gas is adjusted 20 times multiplied by 50%, that is, the input amount of carbon dioxide gas at 8 o'clock is reduced to 10 times. At 9 o'clock, the carbonate ion concentration value is still higher than the concentration preset value, then the minimum input amount of carbon dioxide gas is adjusted 20 times multiplied by 40%. In this way, the automatic adjustment method is performed until it drops to 0%, so that the carbonate ion concentration value is same as the concentration preset value.

The concentration preset value is set based on the water in water tank 2 being the best living environment for coral cultivation. In the present invention, according to the carbon ion concentration value in the solution to be tested 21, when the required amount is a large amount, that is, when large calcium is needed, the water valve switch 14 is first used to close the water tank water inlet pipe 142 to flow calcium reaction water into the water tank 2. Wait for the carbon dioxide gas to be inputted into calcium reactor 3 and form a calcium reaction water with solution to be tested 21, and the calcium reaction water reaches the preset carbonate ion concentration value, then turn on the water tank water inlet pipe 142 through the water valve switch 14. The calcium reaction water in the calcium reactor 3 is inputted into the water tank 2 at once through the calcium reactor water inlet pipe 141 and the water tank water inlet pipe 142 of the calcium reaction control device 1. The water tank water inlet pipe 142 is fully open. The best practice is that the water tank water inlet pipe 142 flows freely into the water tank 2 at the maximum flow rate to avoid the problem of blockage of the water tank water inlet pipe 142. A check valve 6 is provided between the calcium reaction control device 1 and the calcium reactor 3. The check valve 6 is used to control the entry of calcium reaction water through the carbon dioxide gas outlet 15 and the carbon dioxide gas inlet 12 to avoid damage to the internal circuit components of the carbon dioxide cylinder 5 and the calcium reaction control device 1.

In addition, the present invention can use the water valve switch 14 to open the water tank water inlet pipe 142 according to the carbonate ion concentration value in the solution to be tested 21 when the required amount is a small amount, that is, when a small calcium reaction is required, the calcium reaction water will be inputted into the water tank 2 as a constant flow type.

The calcium reaction control device 1 further comprises a PH electrode measuring unit 18 coupled to the carbon dioxide quantitative controller 19. The present invention can also use the PH electrode measuring unit 18 to measure the PH value of the solution to be tested 21, whereby carbon dioxide quantitative controller 19 controls the amount of carbon dioxide bubbles. The PH electrode measuring unit 18 can perform parameter setting correction through the quantitative control interface 17 to ensure normal measurement.

In summary, the present invention can control the flow of carbon dioxide gas to reach a stable state. The carbon dioxide gas flow cycle time can be adjusted by manual or automatic control procedures to adjust the carbonate concentration, so that the water in the breeding tank can reach the best living environment.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A calcium reaction control method applied to a calcium reactor that is used to provide calcium reaction water, the calcium reaction control method comprising the steps of:
   measuring a carbonate ion concentration value in a solution to be tested in a water tank to obtain related measurement results;
   adjusting an input amount of carbon dioxide gas input into said calcium reactor according to the measurement results;
   wherein:
   if the measurement results are less than a concentration preset value, increasing the input amount of said carbon dioxide gas from a previous set value, and then inputting said calcium reaction water into said water tank until the carbonate ion concentration value of said solution to be tested in said water tank equals the concentration preset value; and if the measurement results are greater than the concentration preset value, decreasing the input amount of carbon dioxide gas from the previous set value, and then inputting said calcium reaction water into said water tank until the carbonate ion concentration value of said solution to be tested in said water tank equals said concentration preset value.

2. The calcium reaction control method as claimed in claim 1, wherein when said carbonate ion concentration value is lower than said concentration preset value, a number of times that carbon dioxide gas is input is increased by one; and when said carbonate ion concentration value is higher than said concentration preset value, the number of times that carbon dioxide gas input is decreased by one.

3. The calcium reaction control method as claimed in claim 1, wherein when said carbonate ion concentration value is lower than said concentration preset value and a difference between said carbonate ion concentration value and said concentration preset value is or exceeds a maximum value, adjust the input amount of the carbon dioxide gas to a maximum input percentage above the previous set value; and when said carbonate ion concentration value is higher than said concentration preset value and the difference between said carbonate ion concentration value and said concentration preset value is or exceeds the maximum value, adjust the input amount of the carbon dioxide gas to a minimum value.

4. The calcium reaction control method as claimed in claim 1, wherein a set value of the input amount of the carbon dioxide gas is that a minimum input amount of the carbon dioxide gas is 50% of a maximum input amount of the carbon dioxide gas.

5. The calcium reaction control method as claimed in claim 1, further comprising inputting said calcium reaction water into said water tank at one time.

6. The calcium reaction control method as claimed in claim 1, further comprising inputting said calcium reaction water into said water tank at a constant flow rate.

7. A calcium reaction control device configured to be coupled to:
a water tank storing a solution to be tested,
a calcium reactor, and
a calcium reaction measuring device,
said calcium reaction control device comprising a body, a carbon dioxide gas inlet, a carbonate ion signal transmission unit, said carbon dioxide gas inlet being adapted for receiving carbon dioxide gas, said carbonate ion signal transmission unit being configured to couple to said calcium reaction measuring device, said calcium reaction measuring device being adapted for measuring a carbonate ion concentration value in said solution to be tested,
wherein the calcium reaction control device is configured to:
receive a measurement result from said carbon ion signal transmission unit;
when said measurement result is lower than a concentration preset value, increasing an input amount of said carbon dioxide gas to said calcium reactor from a previous set value, and then providing calcium reaction water from said calcium reactor to said water tank until the measurement result equals a concentration preset value; and
when said measurement result is higher than said concentration preset value, decreasing the input amount of said carbon dioxide gas to said calcium reactor from the previous set value, and then providing said calcium reaction water from said calcium reactor to said water tank until the measurement result equals said concentration preset value.

8. The calcium reaction control device as claimed in claim 7, wherein said calcium reactor is further provided with a calcium reactor water inlet and a calcium reactor water outlet; said body is provided with a water valve switch and a carbon dioxide quantitative controller, said water valve switch comprising a calcium reactor water inlet pipe and a water tank water inlet pipe, the calcium reactor water inlet pipe being connectable to said calcium reactor water inlet, said water tank water inlet pipe being connectable to said water tank, said carbon dioxide quantitative controller being connectable to a carbon dioxide cylinder.

9. The calcium reaction control device as claimed in claim 7, wherein said body is further provided with a carbon dioxide gas outlet and a speed adjuster, said speed adjuster being coupled to said carbon dioxide gas outlet, said speed adjuster being used to adjust an output speed of said carbon dioxide gas from said carbon dioxide gas outlet.

10. The calcium reaction control device as claimed in claim 7, wherein said body is provided with a PH electrode measuring unit.

* * * * *